United States Patent
Zhou

(10) Patent No.: US 10,325,574 B2
(45) Date of Patent: Jun. 18, 2019

(54) SIMULTANEOUS DISPLAY METHOD, SYSTEM, EQUIPMENT BASED ON QT EMBEDDED

(71) Applicant: SHENZHEN A&E INTELLIGENT TECHNOLOGY INSTITUTE CO., LTD., Shenzhen, Guangdong Province (CN)

(72) Inventor: Guolin Zhou, Beijing (CN)

(73) Assignee: SHENZHEN A&E INTELLIGENT TECHNOLOGY INSTITUTE CO., LTD., Shenzhen, Guangdong Province (CN)

(*) Notice: Subject to any disclaimer, the term of this patent is extended or adjusted under 35 U.S.C. 154(b) by 103 days.

(21) Appl. No.: 15/553,981

(22) PCT Filed: Sep. 24, 2015

(86) PCT No.: PCT/CN2015/090492
§ 371 (c)(1),
(2) Date: Aug. 25, 2017

(87) PCT Pub. No.: WO2016/054976
PCT Pub. Date: Apr. 14, 2016

(65) Prior Publication Data
US 2018/0040308 A1  Feb. 8, 2018

(30) Foreign Application Priority Data

Oct. 9, 2014 (CN) .......................... 2014 1 0528481

(51) Int. Cl.
*G09G 5/397* (2006.01)
*G06F 3/14* (2006.01)
*G09G 5/399* (2006.01)

(52) U.S. Cl.
CPC ............... *G09G 5/397* (2013.01); *G06F 3/14* (2013.01); *G09G 5/399* (2013.01); *G09G 2360/18* (2013.01)

(58) Field of Classification Search
CPC .... G09G 5/397; G09G 5/399; G09G 2360/18; G06F 3/14
See application file for complete search history.

(56) References Cited

U.S. PATENT DOCUMENTS

| 2002/0180744 | A1 | 12/2002 | Takala et al. |
| 2004/0230843 | A1* | 11/2004 | Jansen ................... G06F 21/36 726/7 |
| 2008/0317347 | A1* | 12/2008 | Lim ...................... G06T 7/0002 382/182 |

FOREIGN PATENT DOCUMENTS

| CN | 102486726 A | 6/2012 |
| CN | 102821308 A | 12/2012 |
| CN | 104331262 A | 2/2015 |

* cited by examiner

*Primary Examiner* — Maurice L. McDowell, Jr.
*Assistant Examiner* — Donna J. Ricks
(74) *Attorney, Agent, or Firm* — Cheng-Ju Chiang

(57) ABSTRACT

The present disclosure provides a simultaneous display method, system, and computer numerical control machine tool based on QT embedded. The method includes triggering a target QT paint event which displays a first display content; executing a drawing function corresponding to the QT paint event, and meanwhile, triggering a predefined first triggering event; wherein, the first triggering event is used to trigger a frame buffer operation to display a second display content, and the second display content and the first display content are contents required to be simultaneously displayed; displaying the first display content and the second display content simultaneously by a display device. The present disclosure can guarantee that the frame buffer operation is executed after executing the target QT paint event, to (Continued)

ensure that the frame buffer operation and QT embedded drawing are displayed simultaneously, avoiding displaying errors and improving the user experience.

16 Claims, 2 Drawing Sheets

SIMULTANEOUS DISPLAY METHOD, SYSTEM, EQUIPMENT BASED ON QT EMBEDDED

TECHNICAL FIELD

The present disclosure relates to a simultaneous display method based on QT embedded, and more particularly, to a simultaneous display system, equipment based on QT embedded.

BACKGROUND

In the prior art, QT Embedded system is an embedded version system of QT graphical interface development tool, i.e., a graphical interface development tools for embedded systems, which interacts with Linux I/O interface and frame buffer (a standard display device driver interface, i.e., a display drive device) directly, with a high operating efficiency, its overall use of object-oriented programming, and with a good architecture and programming mode. In a particular application, QT Embedded systems is used for commonly software environment of embedded hardware architecture, which has an advantage of cross-platform, the same code can be applied in different operating systems such as Windows, Linux and so on.

However, although using frame buffer in the QT Embedded operating environment can bypass the drawing operating system of QT itself, but frame buffer operation of and graphics display of QT its own is not simultaneous.

Specifically, drawing of QT Embedded itself in the display uses the double buffer method, for a series of display updating requirement in the code, QT will first update the action in the internal display buffer to achieve, i.e., drawing into this invisible (non-display) buffer, and then contents of the internal display buffer are updated unified to the external display buffer corresponding to display screen, i.e., drawing on the screen; the frame buffer operation is equal to effect directly external display buffer corresponding to display screen, i.e., drawing directly on the screen.

Understandably, because when the frame buffer is operating, it does not often know what drawing process of QT its own dose reach, and casing display contents updated by frame buffer are forward/backward display contents updated by QT, i.e., phenomenon that display content does not be updated simultaneously is occurred, and resulting in splash screen, display area is not simultaneous, poor user experience and even produce errors, even display the error to cause unnecessary troubles.

SUMMARY

The present disclosure is primarily to solve the technology problem that frame buffer operation of the prior art and QT graphic display does not display simultaneously, a simultaneous display method, system, and computer numerical control machine tool based on QT embedded is provided to ensure that the frame buffer operation and the QT graphic display displays simultaneously, avoiding displaying errors and unnecessary troubles, improving the user experience.

In order to solve deficiencies of prior art described above, the first technical solution adopted by the present disclosure is: providing a simultaneous display method based on QT embedded, wherein the simultaneous display method comprises: triggering a target QT paint event which displays a first display content; executing a drawing function corresponding to the QT paint event, and meanwhile, triggering a predefined first triggering event; wherein, the first triggering event is used to trigger a frame buffer operation to display a second display content, and the second display content and the first display content are contents required to be simultaneously displayed; displaying the first display content and the second display content simultaneously by a display device.

In one embodiment, before the triggering the target QT paint event, the method comprises: predefining the first triggering event, and setting the first triggering event to be triggered when executing the drawing function.

In one embodiment, the setting the first triggering event to be triggered when executing the drawing function comprises: setting the first triggering event in the drawing function corresponding to the target QT paint event.

In one embodiment, before the setting the first triggering event in the drawing function corresponding to the target QT paint event, the method further comprises: looking up the drawing function of the target QT paint event corresponding to the frame buffer operation, so as to preset the first triggering event in the drawing function.

In one embodiment, the first display content is a character string or a display background, and the second display content is a character string.

In order to solve deficiencies of prior art described above, the second technical solution adopted by the present disclosure is: providing a simultaneous display system based on QT embedded, wherein the simultaneous display system comprises: a trigger module, an executing module, and a display module, the trigger module is used to trigger a target QT paint event which displays a first display content; the executing module is used to execute a drawing function corresponding to the QT paint event, and meanwhile, triggering a predefined first triggering event; wherein, the first triggering event is used to trigger a frame buffer operation to display a second display content, and the second display content and the first display content are contents required to be simultaneously displayed; the display module is used to display the first display content and the second display content simultaneously by a display device.

In one embodiment, the simultaneous display system further comprises a definition module and an event setting module, the definition module is used to predefine the first triggering event; the event setting module is used to set the first triggering event to be triggered when executing the drawing function.

In one embodiment, the event setting module is specifically used to set the first triggering event in the drawing function corresponding to the target QT paint event.

In one embodiment, the simultaneous display system further comprises a lookup module, the lookup module is used to lookup the drawing function of target QT paint event corresponding to the frame buffer operation, so as to preset the first triggering event in the drawing function.

In one embodiment, the first display content is a character string or a display background, and the second display content is a character string.

In order to solve deficiencies of prior art described above, the third technical solution adopted by the present disclosure is: providing a computer numerical control machine tool, which comprises a machine tool body, a numerical control system installed in the machine body, a servo drive device connected electrically to the numerical control system, a motor connected to the servo drive device, and a processing equipment connected to the motor, the numerical control system comprises a simultaneous display system based on QT embedded, wherein the simultaneous display system comprises a trigger module, an executing module, and a display module, the trigger module is used to trigger a target QT paint event which displays a first display content; the executing module is used to execute a drawing function corresponding to the QT paint event, and meanwhile, trigger a predefined first triggering event; wherein, the first triggering event is used to trigger a frame buffer operation to display a second display content, and the second display content and the first display content are contents required to be simultaneously displayed; the display module is used to display the first display content and the second display content simultaneously by a display device.

In one embodiment, the simultaneous display system further comprises a definition module and an event setting module, the definition module is used to predefine the first triggering event t; the event setting module is used to setting the first triggering event to be triggered when executing the drawing function.

In one embodiment, the event setting module is specifically used to set the first triggering event in the drawing function corresponding to the target QT paint event.

In one embodiment, the simultaneous display system further comprises a lookup module, the lookup module is used to lookup the drawing function of target QT paint event corresponding to the frame buffer operation, so as to preset the first triggering event in the drawing function.

In one embodiment, the first display content is a character string or a display background, and the second display content is a character string.

In order to solve deficiencies of prior art described above, the forth technical solution adopted by the present disclosure is: providing a simultaneous display equipment based on QT embedded, wherein the simultaneous display equipment comprises a processor, a memory and a display device, wherein the processor is configured to: trigger a target QT paint event which displays a first display content; execute a drawing function corresponding to the QT paint event, and meanwhile, trigger a predefined first triggering event; wherein, the first triggering event is used to trigger a frame buffer operation to display a second display content, and the second display content and the first display content are contents required to be simultaneously displayed; and display the first display content and the second display content simultaneously by the display device.

In order to solve deficiencies of prior art described above, the fifth technical solution adopted by the present disclosure is: providing a computer-readable storage medium for storing computer program code, wherein when the computer program code is executed by a computer processor, causes the computer processor to execute a simultaneous display method based on QT embedded, wherein the method comprises: triggering a target QT paint event which displays a first display content; executing a drawing function corresponding to the QT paint event, and meanwhile, triggering a predefined first triggering event; wherein, the first triggering event is used to trigger a frame buffer operation to display a second display content, and the second display content and the first display content are contents required to be simultaneously displayed; displaying the first display content and the second display content simultaneously by a display device.

The present disclosure can be concluded with the following advantages, the present disclosure is different from the prior art that the frame buffer operation is executed by triggering a predefined first triggering event, and the first triggering event is triggered when the drawing function is set to the target QT paint event, so as to guarantee that the frame buffer operation is executed simultaneously after executing the target QT paint event, to ensure that the frame buffer operation and QT embedded drawing are displayed simultaneously, i.e., to ensure that the frame buffer operation and operations corresponding to the target QT paint event are displayed simultaneously in the same display screen, avoiding displaying errors and unnecessary troubles, improving the user experience.

BRIEF DESCRIPTION OF THE DRAWINGS

In order to give a better and thorough understanding to the whole and other intended purposes, features and advantages of the technical solution of the present disclosure, detailed description will be given with respect to preferred embodiments provided and illustrated here below in accompanied drawings. Apparently, with the spirit of the embodiments disclosed, person in the skilled in the art can readily come out with other modifications as well as improvements without undue experiment. In addition, other drawings can be readily achieved based on the disclosed drawings.

DETAILED DESCRIPTION

Technical implementation will be described below clearly and fully by combining with drawings made in accordance with an embodiment in the present disclosure. Obviously, the described embodiments are merely part of embodiment of the present disclosure, not at all. Based on the embodiments of the present disclosure, on the premise of embodiments in the absence of creative work, all other embodiments are in the scope of protection in the present disclosure.

Figure 1:
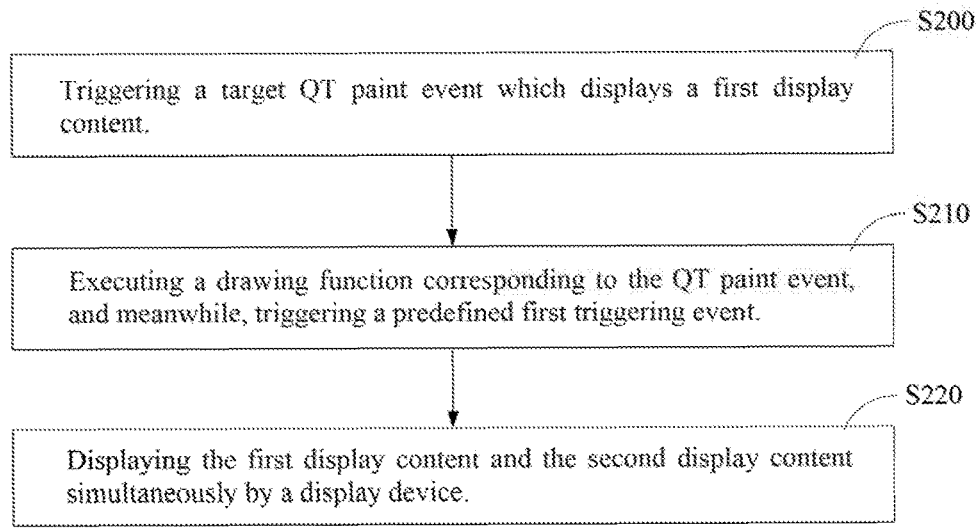
FIG. 1 is a flow chart of one preferred embodiment made in accordance to simultaneous display method in the present disclosure.

Referring to FIG. 1, FIG. 1 is a flow chart of one preferred embodiment made in accordance to simultaneous display method in the present disclosure, the simultaneous display method of the present embodiment is preferably adopted in a system based on QT embedded, which is included but not limited to the following blocks.

In block S200, triggering target QT paint event which displays a first display content.

In block S210, executing a drawing function corresponding to the QT paint event, and meanwhile, triggering a predefined first triggering event.

In one embodiment, the first triggering event may be used to trigger a frame buffer operation to display a second display content, and the second display content and the first display content may be contents required to be simultaneously displayed; the first display content and the second display content may be displayed simultaneously by a display device.

In block S220, displaying the first display content and the second display content simultaneously by a display device.

It should be noticed that, in the block S220, the target QT paint event is triggered by active or passive way. The first triggering event is triggered when the target QT paint event is triggered and the drawing function is executed, to execute the frame buffer operation after the internal display buff is copied to the external display buff, so that the second display content obtained by executing the drawing function and the first display content obtained executing the frame buffer operation are displayed simultaneously. In one embodiment, the first triggering event can be set in the drawing function corresponding to the target QT paint event by a display drive device, and executing the frame buffer operation to achieve updating of display content after triggering.

In addition, in the present embodiment, the frame buffer operation is executed after QT embedded drawing function copies the internal display buff to the external display buff, the next cycle will be repeated, the blocks for each cycle is the same as the above-mentioned blocks, therefore no additional description is given herebelow. These blocks can ensure that the frame buffer operation is always in the currently updated QT embedded drawing background, to achieve that the frame buffer operation and QT embedded drawing are displayed simultaneously. Thus, it prevents the first display content updated by the frame buffer operation from being forward or backward the second display content updated by the QT embedded drawing. It can effectively avoid the splash screen, display errors and unnecessary troubles due to display errors, thereby improving the user experience.

In one embodiment, the first display content may be a character string or a display background, and the second display content may be a character string. It should be noticed that the present embodiment may also be directed to a situation of a plurality of display windows, it just needs to create a mapping for the drawing function of target QT paint event and associated triggering event of frame buffer operation, it is in the reach of person skilled in the art, therefore no additional description is given herebelow.

Figure 2:
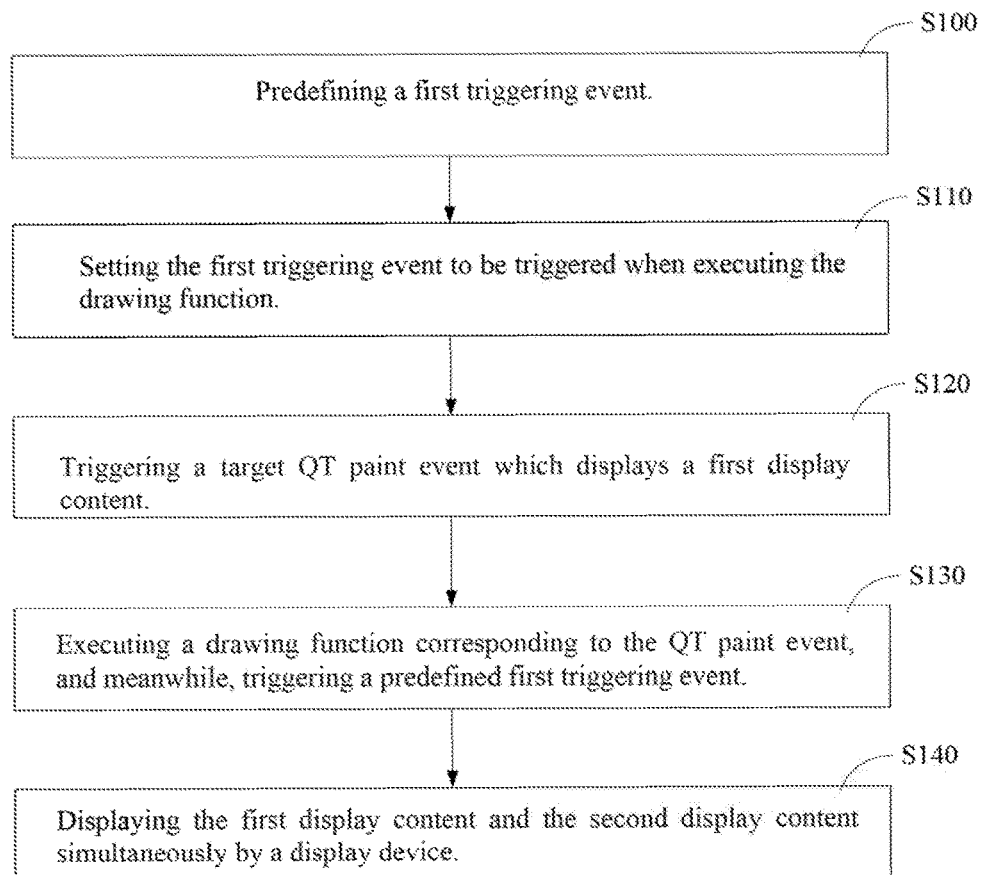
FIG. 2 is a flow chart of another preferred embodiment made in accordance to simultaneous display method in the present disclosure.

Referring to FIG. 2, FIG. 2 is a flow chart of another preferred embodiment made in accordance to simultaneous display method in the present disclosure, the method in the present disclosure includes the following steps:

In block S100, predefining a first triggering event that may be used to trigger a frame buffer operation to display a second display content.

In block S110, setting the first triggering event to be triggered when executing the drawing function.

The predefined first triggering event is a triggered event that match the QT event mechanism of QT embedded, so that it can pass the program of the first triggering event triggering and driving frame buffer, i.e., the embodiment uses QT event of QT embedded to control the frame buffer program, then it can achieve the control of the display.

Block S110 may specifically include: setting the first triggering event in the drawing function corresponding to the target QT paint event.

Preferably, before the block S110, the simultaneous display method of the present embodiment further comprises: looking up the drawing function of target QT paint event corresponding to the frame buffer operation, so as to preset the first triggering event in the drawing function.

The drawing function of QT embedded of the present embodiment can be triggered by a passive action such as a key event, a mouse event, and a drag-and-drop event, e.g., a mouse controls a window to be maximized and minimized. Of course, the drawing function of QT embedded can also be triggered by the active action of a program updating window screen. After triggering, paintEvent( ) function (a drawing function) of QT embedded responds to the process, i.e., when drawing is required, the drawing function of calling window is triggered, then the drawing function draws the contents needed to be updated of the window to the internal display buffer of the QT, and finally the internal display buffer is copied to the external display buffer on the display.

It is not difficult to understand that the frame buffer operation is to operate the external display buffer directly, so the frame buffer operation cannot be set in the drawing function directly, otherwise a defect that the first display content operated by the frame buffer is forward the second display content draw by the QT embedded will be occurred. In order to resolve the technical problem which cannot display simultaneously in the case that the frame buffer operation cannot be set directly in the drawing function, and the first triggering event is set to be triggered when executing the drawing function corresponding to the target QT paint event in the present embodiment.

In order to ensure that the frame buffer operation and the drawing function are directed to the same display window/interface, so that it needs to lookup the drawing function of the target QT paint event corresponding to the frame buffer operation, and then the first triggering event is set in the drawing function. In the present embodiment, execution time of the QT embedded drawing can be found by event mechanism of QT embedded, and the frame buffer operation is determined by determining the next event cycle time which matches QT paint event, it is in the range that skilled in the art appreciate, therefore no additional description is given herebelow.

In block S120, triggering target QT paint event of displaying a first display content.

In block S130, executing a drawing function corresponding to the QT paint event, and meanwhile, triggering a predefined first triggering event.

In one embodiment, the first triggering event is used to trigger a frame buffer operation to display a second display content, and the second display content and the first display content are contents required to be simultaneously displayed; the first display content and the second display content are displayed simultaneously by a display device.

In block S140, displaying the first display content and the second display content simultaneously by a display device.

It should be noticed that, in the block S140, the target QT paint event of the present embodiment is triggered by active or passive way, triggering the target QT paint event and triggering the first triggering event when drawing function is executed, to execute the frame buffer operation after the internal display buff is copied to the external display buff, so that the second display content obtained by executing drawing function and the first display content obtained executing frame buffer operation are displayed simultaneously. The first triggering event can be set in the drawing function corresponding to the target QT paint event by a display drive device, and executing the frame buffer operation to achieve updating of display content after triggering.

In addition, in the present embodiment, the frame buffer operation is executed after QT embedded drawing function copies the internal display buff to the external display buff, the next cycle will be repeated, the blocks for each cycle is the same as the above-mentioned blocks, therefore no additional description is given herebelow. These blocks can ensure that the frame buffer operation is always in the currently updated QT embedded drawing background, to achieve that the frame buffer operation and QT embedded drawing are displayed simultaneously, preventing the first display content updated by the frame buffer operation from being forward or backward the second display content updated by the QT embedded drawing, it can effectively avoid the splash screen, display errors and unnecessary troubles due to display errors, thereby improving the user experience.

In one embodiment, the first display content may be a character string or a display background, and the second display content may be a character string. It should be noticed that the present embodiment may also be directed to a situation of a plurality of display windows, it just needs to create a mapping for the drawing function of target QT paint event and associated triggering event of frame buffer operation, it is in the range that skilled in the art appreciate, therefore no additional description is given herebelow.

Figure 3:
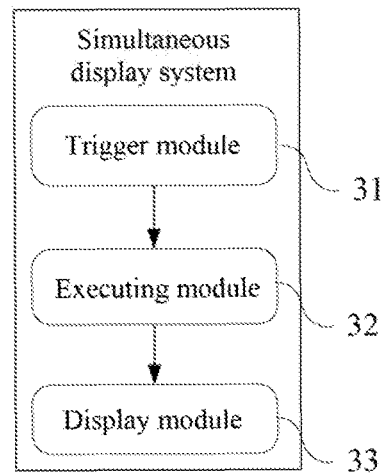
FIG. 3 is a schematic diagram of the first embodiment made in accordance to simultaneous display system in the present disclosure.

In combination with the above embodiments and referring to FIG. 3, FIG. 3 is a schematic diagram of the first embodiment made in accordance to simultaneous display method in the present disclosure. The simultaneous display system of the present embodiment is preferably adopted in a system based on QT embedded, which is included but not limited to a trigger module 31, an executing module 32, and a display module 33.

In particular, the trigger module 31 is used to trigger target QT paint event of displaying a first display content.

The executing module 32 is used to execute a drawing function corresponding to the QT paint event, and meanwhile, triggering a predefined first triggering event; wherein, the first triggering event is used to trigger a frame buffer operation to display a second display content, and the second display content and the first display content are contents required to be simultaneously displayed.

The display module 33 is used to display the first display content and the second display content simultaneously by a display device. The first triggering event can be set in the drawing function corresponding to the target QT paint event by a display drive device, and executing the frame buffer operation to achieve updating of display content after triggering. The display module 33 may be a liquid crystal display or the like and is not limited herebelow.

In one embodiment, the first display content may be a character string or a display background, and the second display content is a character string. The specific implementation process of simultaneous display system of the present embodiment is described in the detailed description of the simultaneous display method, it is in the range that skilled in the arts appreciate, therefore no additional description is given herebelow.

Figure 4:
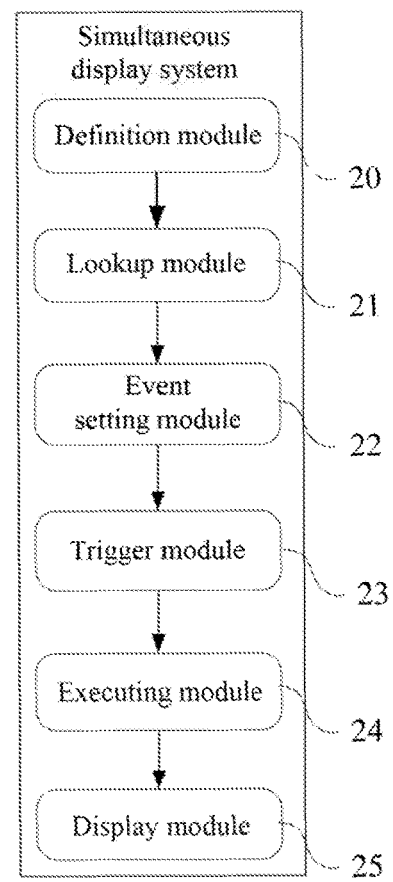
FIG. 4 is a schematic diagram of the second embodiment made in accordance to simultaneous display system in the present disclosure.

Referring to FIG. 4, FIG. 4 is a schematic diagram of the second embodiment made in accordance to simultaneous display system in the present disclosure. The simultaneous display system of the present embodiment is preferably adopted in a system based on QT embedded, which is included but not limited to a definition module 20, a lookup module 21, an event setting module 22, a trigger module 23, an executing module 24, and a display module 25.

In the present embodiment, the definition module 20 is used to predefine a first triggering event that frame buffer operation is used to trigger second display content. In one embodiment, the first triggering event defined by the definition module 20 is a triggered event that match the QT event mechanism of QT embedded, so that it can pass the program of the first triggering event triggering and driving frame buffer, i.e., the embodiment uses QT event of QT embedded to control the frame buffer program, then it can achieve the control of the display.

The event setting module 22 is used to set the first triggering event defined by the definition module 20 to be triggered when executing the drawing function corresponding to the target QT paint event, triggering the target QT paint event and triggering the first triggering event when drawing function is executed, to execute the frame buffer operation after the internal display buff is copied to the external display buff, so that the second display content obtained by executing drawing function and the first display content obtained executing frame buffer operation are displayed simultaneously.

It should be noticed that, in the preferred embodiment, the event setting module 22 is specifically used to set the first triggering event in the drawing function corresponding to the target QT paint event.

The lookup module 21 is used to lookup the drawing function of target QT paint event corresponding to the frame buffer operation, so as the event setting module 22 can set the first triggering event in the drawing function.

The trigger module 23 is used to trigger target QT paint event of displaying a first display content; the executing module 24 is used to execute a drawing function corresponding to the QT paint event, and meanwhile, triggering a predefined first triggering event; according to the event setting module 22 set before, triggering the predefined first trigger event while the above drawing function is executed; wherein, the first triggering event is used to trigger a frame buffer operation to display a second display content, and the second display content and the first display content are contents required to be simultaneously displayed; the display module 25 is used to display the first display content and the second display content simultaneously by a display device. In one embodiment, the first triggering event can be set in the drawing function corresponding to the target QT paint event by a display drive device, and executing the frame buffer operation to achieve updating of display content after triggering. The display module 25 may be a liquid crystal display or the like and is not limited herebelow.

In one embodiment, the first display content may be a character string or a display background, and the second display content is a character string. The specific implementation process of simultaneous display system of the present embodiment is described in the detailed description of the simultaneous display method, it is in the range that skilled in the arts appreciate, therefore no additional description is given herebelow.

The simultaneous display system provided by the present embodiment, wherein the target QT paint event is triggered by active or passive way, triggering the target QT paint event and triggering the first triggering event when drawing function is executed, to execute the frame buffer operation after the internal display buff is copied to the external display buff, so that the second display content obtained by executing drawing function and the first display content obtained executing frame buffer operation are displayed simultaneously. These steps can ensure that the frame buffer operation is always in the currently updated QT embedded drawing background, to achieve that the frame buffer operation and QT embedded drawing are displayed simultaneously, preventing the first display content updated by the frame buffer operation from being forward or backward the second display content updated by the QT embedded drawing, it can effectively avoid the splash screen, display errors and unnecessary troubles due to display errors, thereby improving the user experience.

The present embodiment further provides a computer numerical control machine tool, which comprises a machine tool body, a numerical control system installed in the machine body, a servo drive device connected electrically to the numerical control system, a motor connected to the servo drive device, and a processing equipment connected to the motor, the numerical control system comprises a simultaneous display system based on QT embedded, please refer to the description of the above-mentioned embodiments, therefore no additional description is given herebelow.

The present embodiment further provides a simultaneous display equipment based on QT embedded, wherein which comprises a processor, a memory and a display device, wherein the processor is used to operable: triggering target QT paint event of displaying a first display content; executing a drawing function corresponding to the QT paint event, and meanwhile, triggering a predefined first triggering event; wherein, the first triggering event is used to trigger a frame buffer operation to display a second display content, and the second display content and the first display content are contents required to be simultaneously displayed; displaying the first display content and the second display content simultaneously by a display device. The details of the work of the processor, please refer to the description of the above-mentioned embodiments, therefore no additional description is given herebelow.

In several embodiments provided by the present disclosure, it should be noticed that the disclosed systems, apparatus, and methods may be achieved in other ways. For example, the division of the module or unit is only a logical function division, the actual achievement can have another way of division, e.g., multiple units or components can be combined or can be integrated into another system, or some feature can be ignored or not executed. At the other point, the displayed or discussed coupling or direct coupling or communication connection between each other may be via some interface, the indirect coupling or communication connection of the device or unit may be electrical, mechanical or otherwise.

The units described as separate components may or may not be physically separated, and the display components as units may or may not be physical units, i.e., which can be located in one place, or can be distributed to multiple network elements. The part or all of the units may be selected according to the actual needs to achieve the purpose of the present embodiment.

In addition, each of the functional units in the various embodiments of the present disclosure may be integrated in one processing unit, may be individual units exist alone, or may also be two or more units integrated in a unit. The above-mentioned integrated unit can be achieved in the form of hardware or software function unit.

If the integrated unit is achieved in the form of software functional unit and when it is sold or used as a separate product, it may be stored in a computer-readable storage medium, the computer can read the storage medium for storing computer program code, and the computer program code is executed by a computer processor, cases the computer processor to execute a simultaneous display method based on QT embedded, wherein the method comprises: triggering target QT paint event of displaying a first display content; executing a drawing function corresponding to the QT paint event, and meanwhile, triggering a predefined first triggering event; wherein, the first triggering event is used to trigger a frame buffer operation to display a second display content, and the second display content and the first display content are contents required to be simultaneously displayed; displaying the first display content and the second display content simultaneously by a display device. The specific detail of the method, please refer to the description of the above-mentioned embodiments, therefore no additional description is given herebelow.

Based on this understanding, the technical solution of the present disclosure, either the essence, or a part which contributes to the prior art, or all or part of the technical solution, may be embodied in the form of software product, the computer software product is stored in a storage medium, which comprises several commands, so as to case a computer device (which may be a personal computer, a management server, or a network device, etc.) or a processor to execute all or part of the steps of the method described in the each embodiment of the present disclosure. The above-mentioned storage medium includes a USB disk, a mobile hard disk, a read-only memory, a random-access memory, a hard disk, or a CD, and medium can store the code of the program code.

Embodiments of the present disclosure have been described, but not intending to impose any unduly constraint to the appended claims. Any modification of equivalent structure or equivalent process made according to the disclosure and drawings of the present disclosure, or any application thereof, directly or indirectly, to other related fields of technique, is considered encompassed in the scope of protection defined by the claims of the present disclosure.

What is claimed is:

1. A simultaneous display method based on QT embedded, comprising:
   triggering a target QT paint event which displays a first display content;
   executing a drawing function corresponding to the QT paint event, and meanwhile, triggering a predefined first triggering event; wherein, the first triggering event is used to trigger a frame buffer operation to display a second display content, and the second display content and the first display content are contents required to be simultaneously displayed; and
   displaying the first display content and the second display content simultaneously by a display device;
   wherein before executing the drawing function corresponding to the QT paint event, the method further comprises:
   looking up the drawing function of the target QT paint event corresponding to the frame buffer operation, so as to preset the first triggering event in the drawing function.

2. The method as recited in claim 1, before the triggering the target QT paint event, further comprising:
   predefining the first triggering event, and setting the first triggering event to be triggered when executing the drawing function.

3. The method as recited in claim 2, wherein the setting the first triggering event to be triggered when executing the drawing function comprises:
   setting the first triggering event in the drawing function corresponding to the target QT paint event.

4. The method as recited in claim 1, wherein the first display content is a character string or a display background, and the second display content is a character string.

5. A computer numerical control machine tool comprising a machine tool body, a numerical control system installed in the machine body, a servo drive device connected electrically to the numerical control system, a motor connected to the servo drive device, and a processing equipment connected to the motor, the numerical control system comprises a simultaneous display system based on QT embedded, wherein the simultaneous display system comprises a processor, a memory and a display device, the processor is configured to:

trigger a target QT paint event which displays a first display content;

execute a drawing function corresponding to the QT paint event, and meanwhile, trigger a predefined first triggering event; wherein, the first triggering event is used to trigger a frame buffer operation to display a second display content, and the second display content and the first display content are contents required to be simultaneously displayed; and display the first display content and the second display content simultaneously by the display device;

wherein before executing a drawing function corresponding to the QT paint event, the processor is further configured to lookup the drawing function of the target QT paint event corresponding to the frame buffer operation, so as to preset the first triggering event in the drawing function.

6. The computer numerical control machine tool as recited in claim 5, wherein the processor is further configured to:
predefine the first triggering event; and
set the first triggering event to be triggered when executing the drawing function.

7. The computer numerical control machine tool as recited in claim 6, wherein the processor is further configured to set the first triggering event in the drawing function corresponding to the target QT paint event.

8. The computer numerical control machine tool as recited in claim 5, wherein the first display content is a character string or a display background, and the second display content is a character string.

9. A simultaneous display equipment based on QT embedded, comprising a processor, a memory and a display device, wherein the processor is configured to:

trigger a target QT paint event which displays a first display content;

execute a drawing function corresponding to the QT paint event, and meanwhile, trigger a predefined first triggering event; wherein, the first triggering event is used to trigger a frame buffer operation to display a second display content, and the second display content and the first display content are contents required to be simultaneously displayed; and display the first display content and the second display content simultaneously by the display device;

wherein before executing a drawing function corresponding to the QT paint event, the processor is further configured to lookup the drawing function of the target QT paint event corresponding to the frame buffer operation, so as to preset the first triggering event in the drawing function.

10. The simultaneous display equipment as recited in claim 9, wherein the processor is further configured to:
predefine the first triggering event and set the first triggering event to be triggered when executing the drawing function.

11. The simultaneous display equipment as recited in claim 10, wherein the processor is further configured to set the first triggering event in the drawing function corresponding to the target QT paint event.

12. The simultaneous display equipment as recited in claim 9, wherein the first display content is a character string or a display background, and the second display content is a character string.

13. A non-transitory tangible computer-readable storage medium for storing computer program code, wherein when the computer program code is executed by a computer processor, causes the computer processor to execute a simultaneous display method based on QT embedded, wherein the method comprises:

triggering a target QT paint event which displays a first display content;

executing a drawing function corresponding to the QT paint event, and meanwhile, triggering a predefined first triggering event; wherein, the first triggering event is used to trigger a frame buffer operation to display a second display content, and the second display content and the first display content are contents required to be simultaneously displayed; and displaying the first display content and the second display content simultaneously by a display device;

wherein before executing the drawing function corresponding to the QT paint event, the method further comprises:

looking up the drawing function of the target QT paint event corresponding to the frame buffer operation, so as to preset the first triggering event in the drawing function.

14. The non-transitory tangible computer-readable storage medium as recited in claim 13, wherein the method further comprises predefining the first triggering event and setting the first triggering event to be triggered when executing the drawing function.

15. The non-transitory tangible computer-readable storage medium as recited in claim 14, wherein the setting the first triggering event to be triggered when executing the drawing function comprises:

setting the first triggering event in the drawing function corresponding to the target QT paint event.

16. The non-transitory tangible computer-readable storage medium as recited in claim 13, wherein the first display content is a character string or a display background, and the second display content is a character string.

* * * * *